(12) United States Patent
Crowe (10) Patent No.: US 9,041,242 B2
(45) Date of Patent: May 26, 2015

(54) METHOD OF POWERING MOBILE EQUIPMENT

(71) Applicant: FLSmidth A/S, Valby (DK)

(72) Inventor: James Crowe, Bethlehem, PA (US)

(73) Assignee: FLSMIDTH A/S (DK)

( * ) Notice: Subject to any disclaimer, the term of this patent is extended or adjusted under 35 U.S.C. 154(b) by 125 days.

(21) Appl. No.: 13/726,989

(22) Filed: Dec. 26, 2012

(65) Prior Publication Data

US 2014/0179154 A1 Jun. 26, 2014

Related U.S. Application Data

(60) Provisional application No. 61/580,748, filed on Dec. 28, 2011.

(51) Int. Cl.
*H02G 1/06* (2006.01)
*H02G 11/02* (2006.01)

(52) U.S. Cl.
CPC ............. *H02G 11/02* (2013.01); *H02G 1/06* (2013.01); *Y10T 29/49174* (2015.01)

(58) Field of Classification Search
CPC .......... H02G 11/02; H02G 11/00; H02G 1/06
USPC ........................................................ 307/9.1
See application file for complete search history.

(56) References Cited

U.S. PATENT DOCUMENTS

| 3,831,870 | A | * | 8/1974 | Daniel | 242/474.9 |
| 4,587,383 | A | | 5/1986 | Stoldt | |
| 4,725,697 | A | * | 2/1988 | Kovacik et al. | 191/12.4 |
| 6,612,516 | B1 | * | 9/2003 | Haines | 242/397.1 |
| 7,931,133 | B2 | | 4/2011 | Vannest | |
| 2009/0266435 | A1 | | 10/2009 | Ferrone | |
| 2011/0093170 | A1 | | 4/2011 | Yuet et al. | |

OTHER PUBLICATIONS

The International Search Report and Written Opinion dated Feb. 27, 2013, 6 pages.

* cited by examiner

*Primary Examiner* — Jared Fureman
*Assistant Examiner* — Joel Barnett
(74) *Attorney, Agent, or Firm* — Matthew R. Weaver; Aaron M. Pile; Daniel DeJoseph (57) ABSTRACT

A method of providing operating electrical power from a stationary power source to a mobile conveyor utilized in material handling at a mine site as the conveyor moves over a predetermined path at the site without having to move long lengths of cable as the conveyor moves away from the power source. The method utilizes a cable reel that features a power receptacle into which a cable connector can be easily plugged and unplugged.

5 Claims, 12 Drawing Sheets

METHOD OF POWERING MOBILE EQUIPMENT

CROSS-REFERENCE TO RELATED APPLICATION

This application claims the benefit of U.S. Provisional Application No. 61/580,748, filed Dec. 28, 2011.

FIELD OF INVENTION

The present invention relates to material handling and, more particularly, relates to apparatuses and methods for stacking material such as ores, minerals or agglomerated material at mine sites. In more particularity, this invention relates to a method of powering large mobile equipment such as very large and slow moving equipment used in such applications.

BACKGROUND AND DESCRIPTION OF THE PRIOR ART

Conveyors may be used in stackers to stack material or in devices configured to reclaim material from a stack. Typically, systems designed for stacking and reclaiming material utilize a number of conveyors. One set of conveyors is typically used to convey material to a stacker for stacking in a particular area. Another set of conveyors is used to reclaim the material stacked in that area. Examples of systems used to stack material or reclaim material are disclosed in U.S. Pat. Nos. 7,191,888, 6,782,993, 6,085,890, 5,609,397, 5,562,194, 5,090,549, 4,139,087, 3,604,757, 2,851,150 and 1,996,488.

Conveyor systems used to stack material or reclaim material often include a system of conveying devices. For example, overland conveyors are often used to transport material over relatively long distances to different locations. An overland stacking conveyor may be configured to move material from a material receiving location to a storage pile. An overland reclaiming conveyor may be configured to convey material from a storage area to an area designated for using the material. Typically, a mobile bridge conveyor or other conveyor is positioned adjacent to a stacking overland conveyor. An overland tripper may be configured to feed material from an overland conveyor to a mobile bridge conveyor. A mobile overland tripper straddles the overland and typically travels a long distance (e.g. 2000 m or more). The mobile overland tripper may feed material from a stacking overland conveyor onto a mobile stacking and reclaiming apparatus for stacking the material.

The tripper is powered electrically and often supplies power to downstream equipment, thus requiring multiple cables and power connections. It is impractical for mobile trippers to carry the entire amount of power cable needed to travel over such distances, as the size of cable reel required can become impractically large for very long cables. Although a cable drum can hold significantly more cable than a cable reel, its use adds substantially more length and cost to the tripper conveyor compared to a cable reel. In addition, weight is an issue for trippers, which can weigh 200,000 pounds or more.

The power cable used for tripper conveyors is comparatively thick (~2½-3" diameter) and heavy (~1000 kg/100 m). Therefore, to conserve both space and weight on the tripper, tripper conveyors will typically carry about 100-400 m of cable on a reel, which will be not nearly as long as the path that the tripper has to traverse, which can often be in excess of 2000 m. Therefore, it will be necessary during the operation of the tripper to move the cable carried by the tripper from power outlet to power outlet. If the tripper carries, as an example, 200 m of cable, it will be necessary to move over 2000 kg of bulky, hard to maneuver cable to the next power outlet. Reattaching and attaching the cable to another position along the tripper's path can easily take half a day, with it being necessary to put the cable on a pallet or dolly drag it to the next outlet. Such a procedure is very manpower intensive, and increases the risk of potential back injury to personnel handling the cable.

Therefore it would be advantageous, and it is an object of this invention, to have a method of reattaching and attaching a power cable used to electrically power large mobile conveyors for the distance of the path the tripper takes while in operation.

SUMMARY OF THE INVENTION

The present invention provides a method of supplying operating electrical power from a stationary power source to a mobile conveyor utilized in material handling at a mine site as the conveyor moves over a predetermined path at the site without having to move long lengths of cable as the conveyor moves away from the power source. The method utilizes a cable reel that features a power receptacle into which a cable connector can be easily plugged and unplugged.

BRIEF DESCRIPTION OF THE DRAWINGS

The figures are not necessarily drawn to scale.

DESCRIPTION OF THE INVENTION

Figure 1:
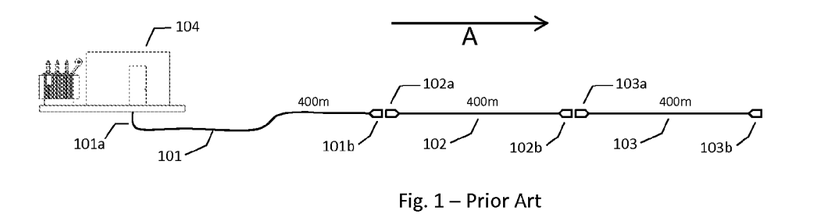
FIGS. 1-8 show a prior art method of powering a mobile conveyor using electrical cable.

FIG. 1 depicts a prior art layout of cables prior to the movement of the mobile conveyor. Individual cables 101, 102 and 103, each 400m in length, are laid out in combination parallel to the path that the conveyor will move, which is in the direction of arrow A. Cable 101 has on one end 101a, which in the depicted view is the left end, an electrical connector or plug (not shown) that is wired into the electric house 104 which provides electrical power to the cable. On cable 101's other, i.e. right, end there is electrical plug 101b. Cables 102 and 103 each have an electrical plug, respectively 102a and 103a on each cable's left end that is located closer to electric house 104 and a plug, respectively 102b and 103b, on each cable's opposite, i.e. right, end that is located further from electric house 104.

Figure 2:
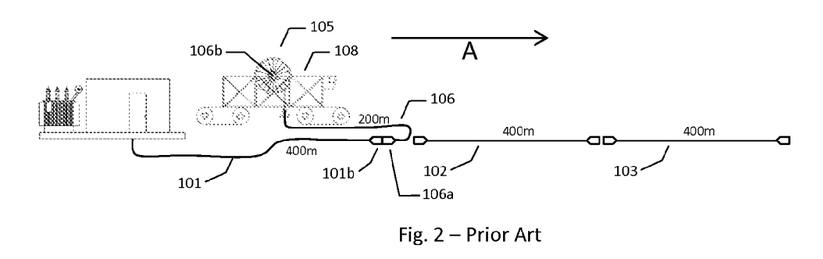

FIG. 2 is the first in a sequence showing the procedure, according to one prior art method, for powering a mobile conveyor as it traverses a path in a mining environment in the direction of arrow A. Reel 105, from which cable 106 has been unwound, is fixedly mounted on a mobile conveyor 108. In the position depicted in FIG. 2, the mobile conveyor has advanced approximately half the distance of cable 101, i.e. approximately 200 yards in the direction of arrow A. Cable 106 has been unwound to its complete length and has an electrical plug 106a on one end, with a plug on its other end 106b being hard wired into the junction box (not shown) proximate to the reel. Plug 106a is connected to plug 101b of cable 101 to thereby provide power from the electric house 104 to the mobile conveyor 108.

Figure 3:
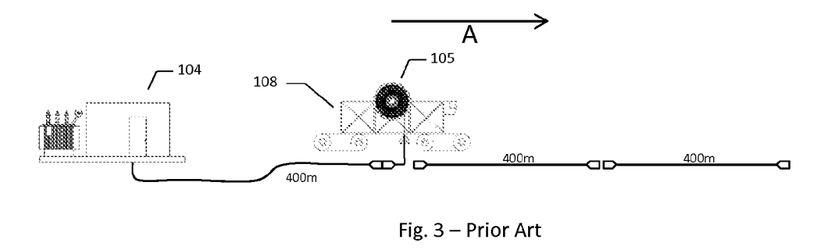

FIG. 3 depicts reel 105 having drawn up essentially all of cable 106 while the mobile conveyor 108 moved approximately 200 m in the direction of arrow A. Mobile conveyor 108 still maintains electrical connection with electric house 104.

Figure 4:
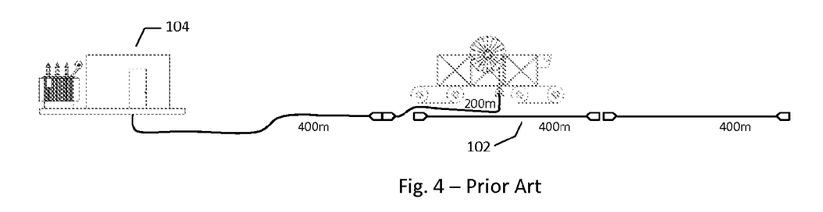

In FIG. 4, the mobile conveyor 108 has moved another 200 m in the direction of arrow A, in the process unwinding essentially all of cable 106 from reel 105. With the cable having been completely drawn out from reel 105, mobile conveyor cannot to move any further in the direction of arrow A and still maintain an electrical connection with electric house 104. The relocation of cable 106 is now required.

Figure 5:
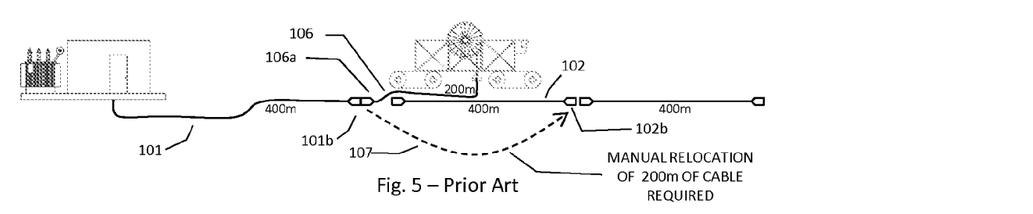

In FIG. 5 the path the relocation of cable 106 will take, as represented by dotted line 107, is depicted. Plug 106a must be disconnected from plug 101b and the cable is moved over 400 meters after which plug 101b is connected to the male plug 102b at the far right end of cable 102, that is, the end of cable 102 furthest from the electric house 104. This requires moving cable weighing over 2000 kg 400 meters in a matter that will not unduly stress the cable.

Figure 6:
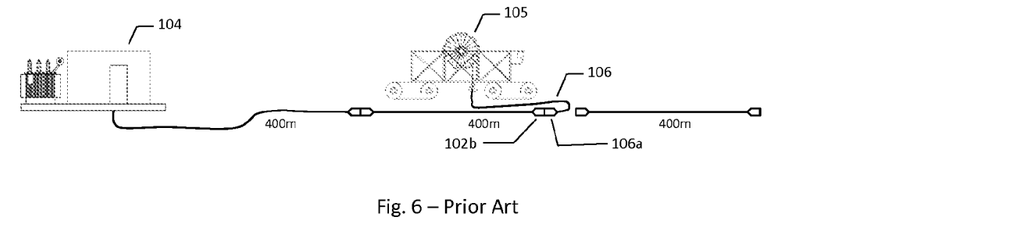

In FIG. 6 the movement of the cable has been completed. Furthermore, plug 106a is connected with plug 102b and plug 101b is connected to plug 102a to complete the connection of electric house 104 to reel 105.

Figure 7:
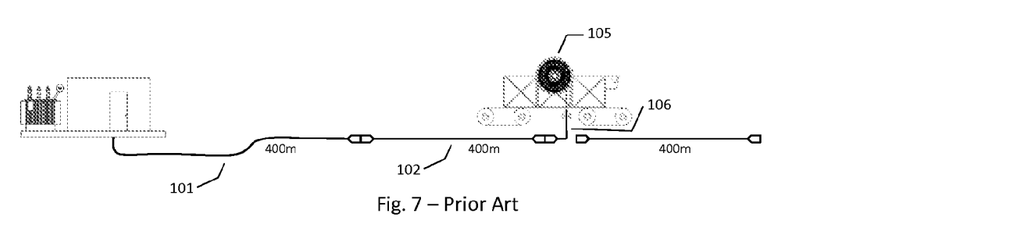

In FIG. 7 cable 106 is drawn up by reel 105 as the mobile conveyor has moved another 200 meters in the direction of Arrow A to be roughly aligned with the right end of cable 102.

Figure 8:
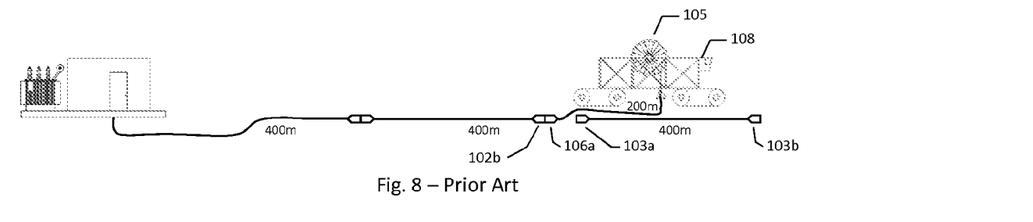

In FIG. 8 the mobile conveyor 108 has moved another 200 meters to the right in the direction of arrow A and the cable has been drawn out from reel 105. For the mobile conveyor to continue to move in the direction of arrow A cable 106 must be again moved in the manner depicted in FIG. 5, that is cable 106's plug 106a must be disconnected from plug 102b, moved 400 meters in the direction of Arrow A, and connected to plug 103b. To complete the connection to reel 105, plug 102b is connected to plug 103a.

FIGS. 9-19 depict one embodiment of the present invention for powering a mobile conveyor such as a mobile tripper 208.

Figure 9:
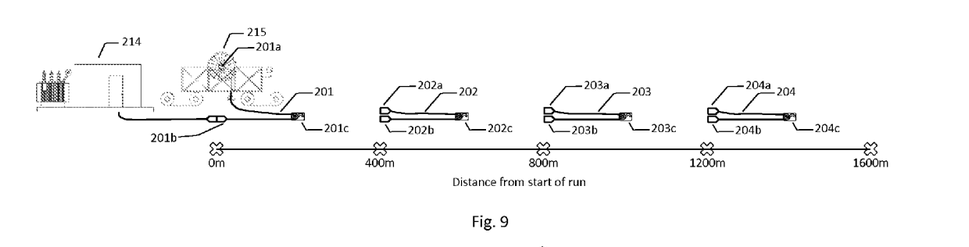
FIGS. 9-19 sequentially set forth one embodiment of the present invention's method of powering a mobile conveyor.

As shown in FIG. 9, the cables 201-204 (also referred to as, respectively, the first, second, third and fourth laid out cables) are laid out in a manner roughly adjacent to and in combination approximately parallel to the mobile conveyor's predetermined path. The cables however are not laid out end to end in the manner shown in FIG. 1, but are folded back upon themselves, approximately in the form of a thin letter "V", so that when so laid out the ends of each cable, and therefore the plugs located at the ends (201a and b, 202a and 202b and so on), are placed proximate to each other and are located nearer to a stationary power source, i.e. electrical house 214, than the foldover points (also referred to as the "fold") in each cable at the base or point of the "V", represented as 201c, 202c, 203c and 204c. As depicted, the cables are 400m in length, although it is understood that this is not a required length of the cables, and the length can vary depending upon the requirements of the practitioner. Another feature of the present invention is that reel 215 is constructed with a plug that is adaptable to be wired into an adjacent junction box on the conveyor, which plug is designed to be easily and quickly connected to and disconnected from a plug from a power cable. Thus, a cable delivering power to the reel from a power source removed from the conveyor does not have to be hard wired into the junction box. Thus, as depicted in FIG. 9, plug 201b is connected to the electric house and its opposite plug 201a is connected to a mating plug (not shown in the Figure) on reel 215. It is one of the advantages of this embodiment of the present invention that a dedicated cable (in the manner of cable 106 as seen in FIGS. 1-8) is not needed for reel 215. Therefore, when reel 215 is electrically connected to a junction box located on mobile conveyor 208, and cable 201 is used to supply power from electrical house 214 to reel 215, mobile conveyor 208 will be supplied with electrical power.

Figure 10:
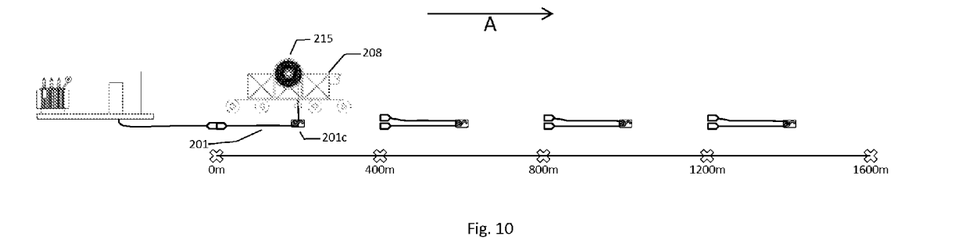

With reference to FIG. 10, as the mobile conveyor 208 moves in the direction of arrow A, and toward fold 201c, reel 215 picks or spools up cable 201 until the reel is full when conveyor 208 comes up adjacent to fold 201c. At this point the cable, which was folded back upon itself when initially laid out, is easily flipped over at point 201c in the manner described herein. Reel 215 will commence to unwind cable 201 as the conveyor moves in the direction of arrow A toward cable 202.

Figure 11:
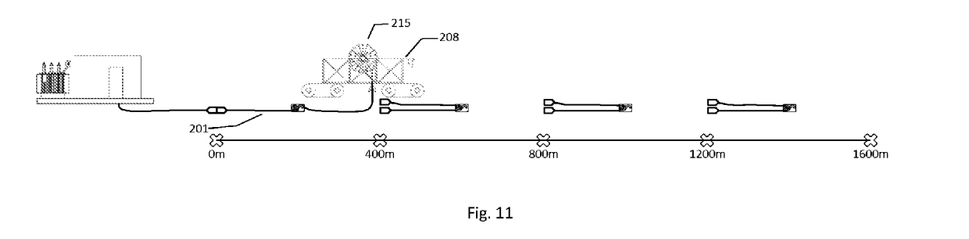

FIG. 11 shows conveyor 208 having advanced another 200 meters, that is, with essentially the entire length of cable 201 having spooled out and the reel being substantially empty of cable.

Figure 12:
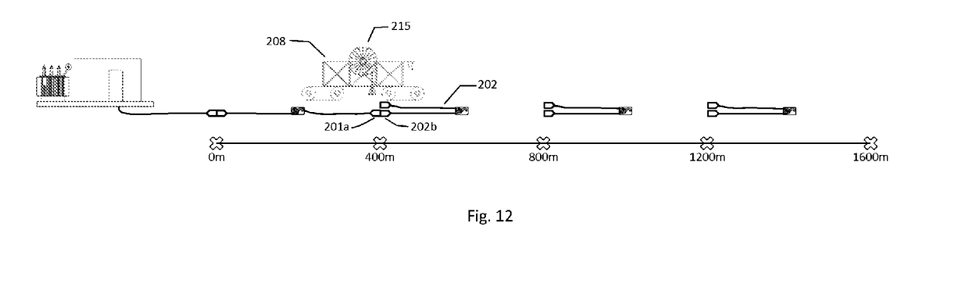

In FIG. 12, plug 201a is disconnected from reel 215 and connected with plug 202b of cable 202. As depicted line 202 is live, but no power is depicted going to conveyor 208.

Figure 13:
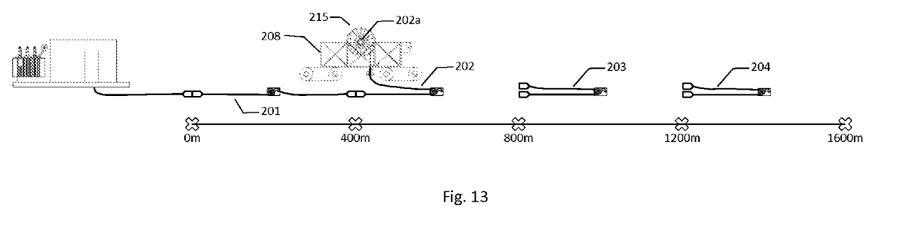

In FIG. 13, plug 202a is connected to reel 215, with conveyor 208 therefore becoming live. It is seen that by utilizing the present method there is much less cable handling and moving than in prior art systems, as moving the cable over long distances is not required.

Figure 14:
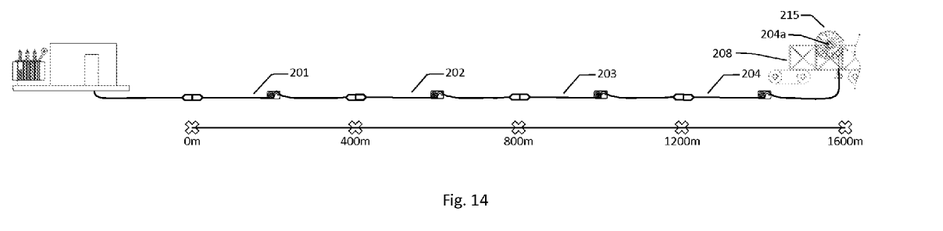

This sequence will be repeated for each of cables 203 and 204 as mobile conveyor 208 continues to move in the direction of arrow A. FIG. 14 shows the mobile conveyor at the end of the run in the direction of arrow A with plug 204a being connected into the conveyor and all of the cables being live.

Figure 15:
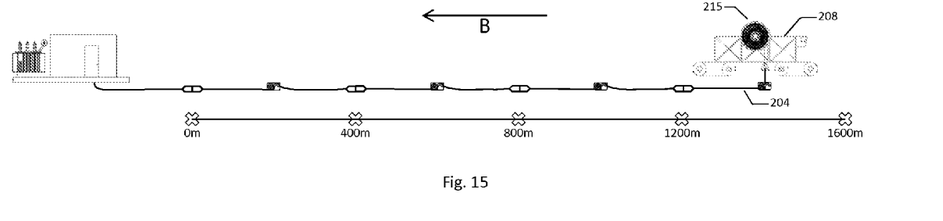

In FIG. 15 conveyor 208 now begins to move on its reverse path in the direction of arrow B. Reel 105 has drawn up its maximum capacity of cable 204.

Figure 16:
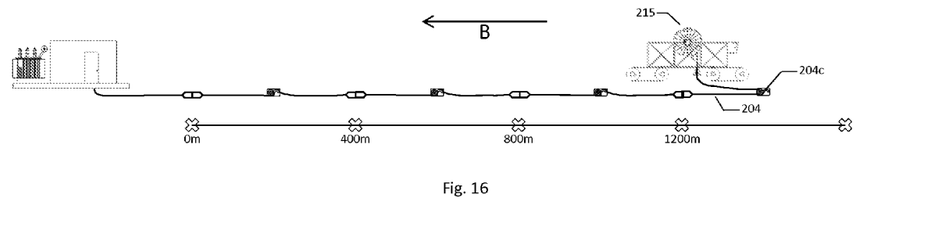

In FIG. 16 cable 204 has been substantially unreeled is folded back upon itself at point 204c as the reel continues to move from right to left in the direction of arrow B.

Figure 17:
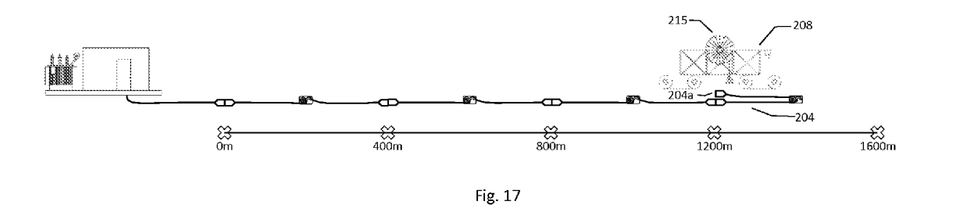

In FIG. 17 plug 204a is disconnected from reel 215. Mobile conveyor 208 is therefore without power.

Figure 18:
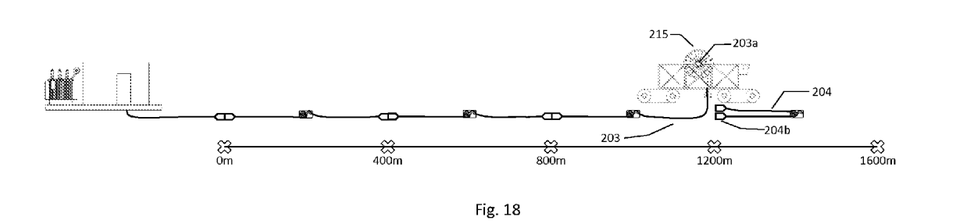

In FIG. 18 plug 204b has been disconnected from female plug 204a, Cable 204 is therefore no longer live, and is now folded back upon itself and is in the initial position depicted in FIG. 9. Plug 203a has been connected to reel 215, thus reestablishing power to reel 215 and therefore the mobile conveyor.

Figure 19:
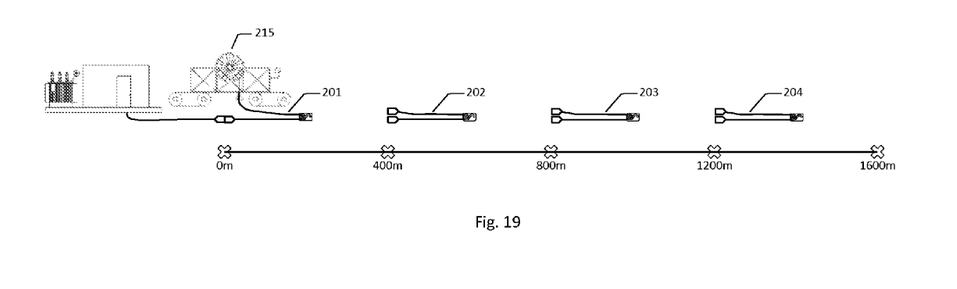

This sequence is repeated as the mobile conveyor continues to retrace its path in the direction of arrow B. FIG. 19 shows the conveyor at the far left of its run, where it is in the same position as it was in FIG. 9. The sequence as shown can be repeated indefinitely, if desired.

Figure 20:
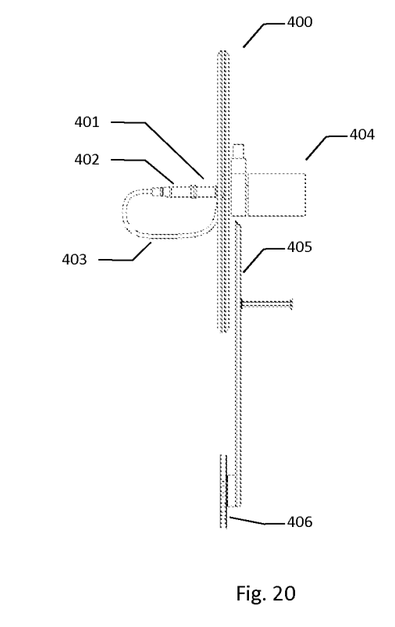
FIG. 20 is a side view of the novel cable reel of the present invention.
Figure 21:
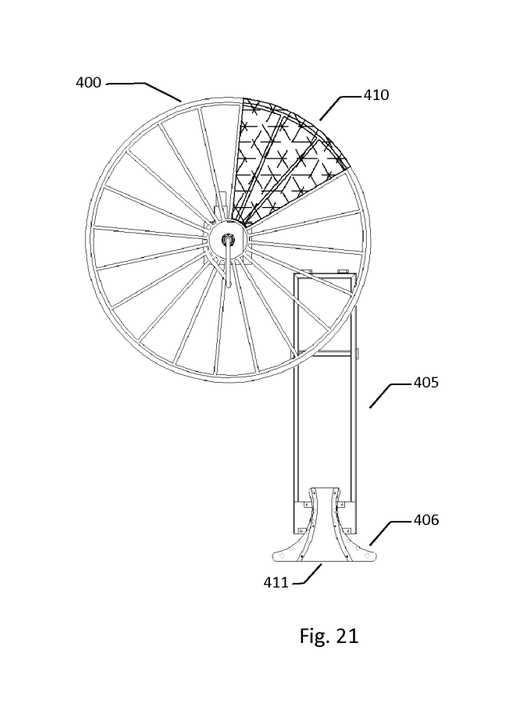
FIG. 21 is an elevation view of the cable reel of the present invention.

FIGS. 20-21 depict the cable reel 400 advantageously used in the present invention. One unique feature of cable reel 400 is plug 401 which is wired into the reel and which permits a mating plug 402 on one end of a power cable, such as cable 403 in the Figure, to be quickly connected and disconnected. Reel 400 further comprises cable reel drive unit 404. Cable diverter 406 is associated with and is proximate to the reel, and aids in directing the power cable utilized in conjunction with the reel, particularly at the foldover points. Cable diverter 406 has cover 411, with diverter 406 being mounted on machine frame 405. Cable reel 400 further has section 410, which is also depicted in FIG. 22, which is removable as shown by arrow D to permit a power cable to have access to the interior of the reel.

Figure 22:
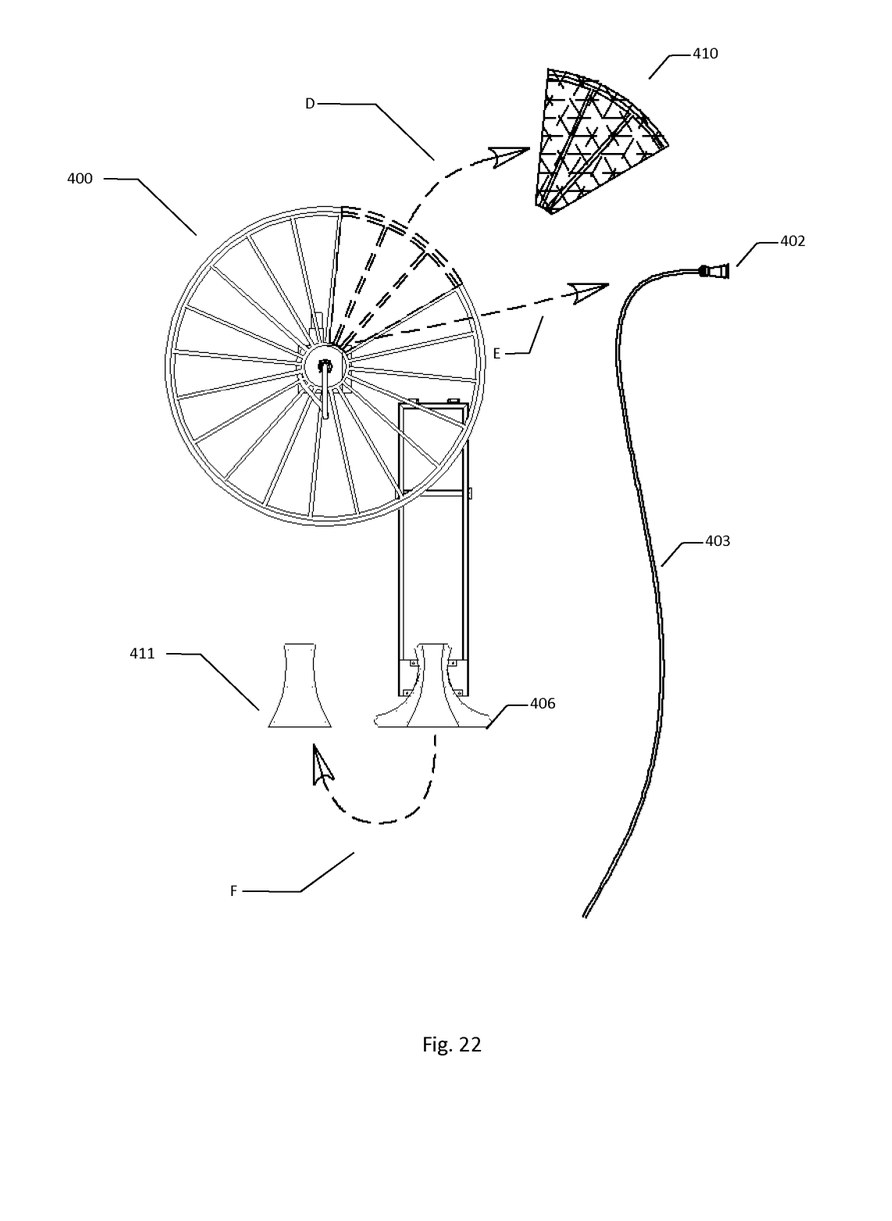
FIG. 22 is an elevation view of the cable reel including the diverter showing removable parts.

FIG. 22 shows the reel section 410 which is removable as per arrow D, diverter cover plate 411, removable as per arrow F, which together allow the cable 403, with plug 402 attached to it, to be conveniently removed as per arrows E and to thereafter permit the rapid installation of the next cable in the series.

Figure 23:
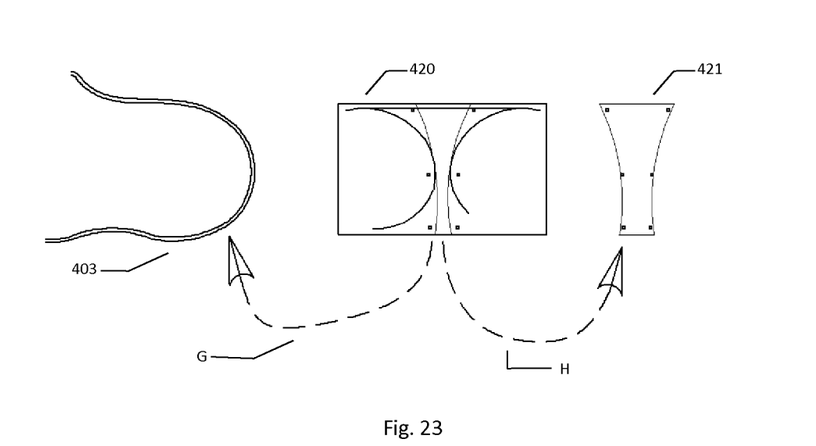
FIG. 23 depicts the flipover including a removable cover plate.

FIG. 23 illustrates flipover 420, including a removable cover plate 421, on the flipover to allow convenient installation/removal of the cable in the flipover. The flipover is optionally utilized at a foldover point in the cable, i.e. 201c, 202c etc. It's advantageous to have a flipover at that point when the cable begins to loop back in the opposite direction when the conveyor passes by. When the cable begins to fold back on itself—that is, from the V position to a straight cable or vice versa, a flipover is employed to support the cable so it doesn't fold too severely back on itself so when conveyor passes over at that point and sweeps along the cable the cable won't become damaged from too much stress. On the mobile conveyor's return run the flipover will reverse the process and begin turning the cable over on itself.

Figure 24:
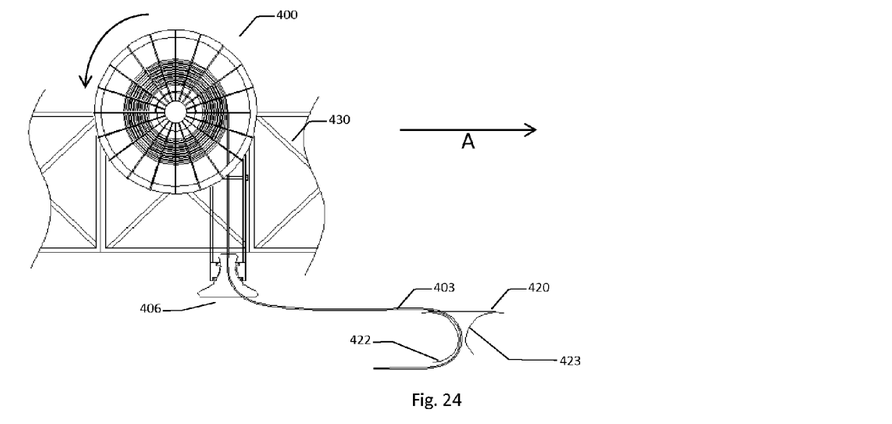
FIG. 24-26 sequentially depicts the use of a flipover in conjunction with the movement of the cable reel.
Figure 25:
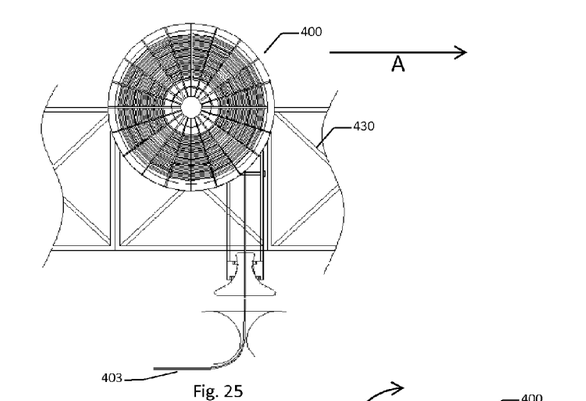
Figure 26:
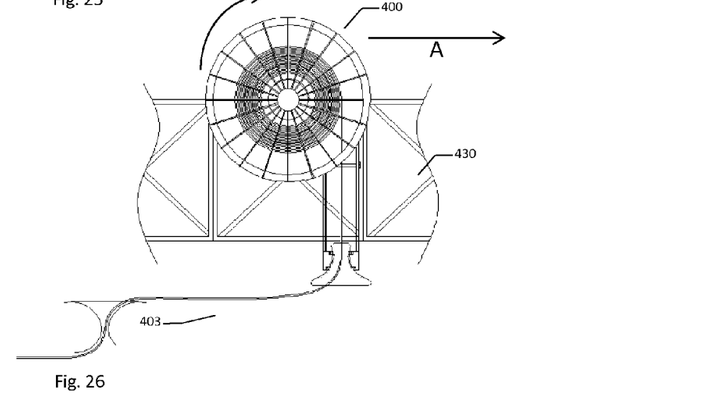

The use of a flipover is further illustrated in FIGS. 24-26. FIG. 24 shows the cable reel 400 and mobile conveyor 430 on the left side of flipover 420 while moving in the direction of Arrow A. In the case where the mobile conveyor 430 is traveling toward the flipover 420, the cable reel 400 is rotating counterclockwise and reeling in the cable. Flipover 420 is configured in part with a left semicircle 422 and a right semicircle 423, both adaptable to receive cable 403. Diverter 406 diverts the cable 403 to the right in the direction of flipover 420, in which the cable loops around left semicircle 421 and folds back on itself.

FIG. 25 shows the cable reel 400 and mobile conveyor 430 directly over the flipover 420. The diverter 406 directs the cable 403 straight down toward flipover 420.

FIG. 26 shows the cable reel & MOT on the right side of the filpover and moving away from the flipover in the direction of arrow A. As the MOT is traveling away from the filpover, the cable reel is rotating clockwise and spooling out the cable 403. Diverter 406 diverts the cable 403 to the left in the direction of flipover 420, in which the cable loops around right semicircle 423 and folds over as it begins to be laid out more or less straight.

FIGS. 27 to 36 depict an alternate embodiment of this invention, in which two cable reels are utilized. In this embodiment the cables do not have to be folded back on themselves when laid out.

Figure 27:
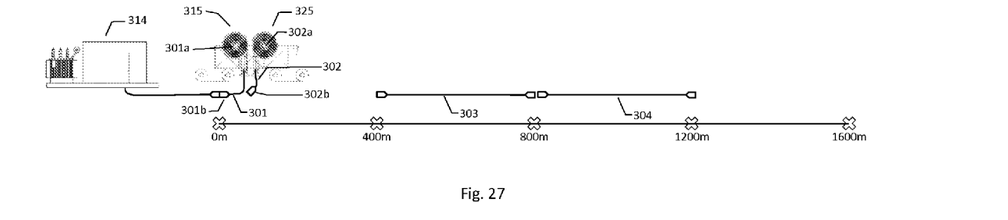
FIG. 27-34 sequentially set forth another embodiment of the present invention's method of powdering a mobile conveyor in which two cable reels are employed.

FIG. 27 shows the initial position of cable reels 315 and 325. Both reels are loaded with cable to their full capacity, which in this case is 400 m of cable, with reel 315 holding first section of cable 301 and reel 325 holding second section of cable 302. Both reels are wired into a junction box (not shown) on the conveyor and each reel has a plug electrically connected to the junction box which is capable of easily being connected to and disconnecting a mating plug on the end of a power cable. As depicted, plug 301a of cable 301 is connected into reel 315, and plug 301b is connected to electric house 314. Thus cable 301 is powered up along with reel 315, and therefore the conveyor—to which the reel is electrically connected—has power. Conversely, while plug 302a of cable 302 is connected into a plug in reel 315, plug 302b, on the opposite end of cable 302, remains unconnected. Therefore, reel 325 is not powered. Cables 303 and 304 (respectively the third and fourth section of cable) are laid out sequentially, although not all the cable has to be laid out in advance of the conveyor's operation, and one or more cables can be laid out while the conveyor is in operation. Cables 303 and 304 are laid out end to end and approximately parallel to the path to be taken by conveyor 308.

Figure 28:
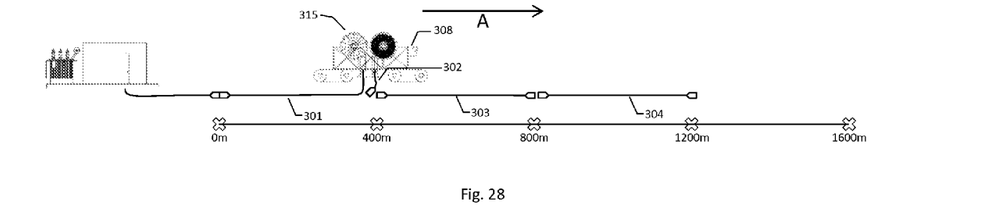

In FIG. 28 conveyor 308 has moved approximately 400 m to the right in the direction of arrow A. Reel 315 has unspooled cable 301. Alternatively, the relative positions of the cables and reels as shown in FIG. 28 can be arrived at if reel 325 initially starts out empty, but in connected to cable 302, with cable 302 being laid out in the same manner as cables 303, 304 and 305. In such a case as the conveyor moved in the direction of Arrow A reel 325 would have spooled up cable 302 while reel 315 was unspooling and laying out cable 301 in the manner depicted in FIGS. 27 and 28.

Figure 29:
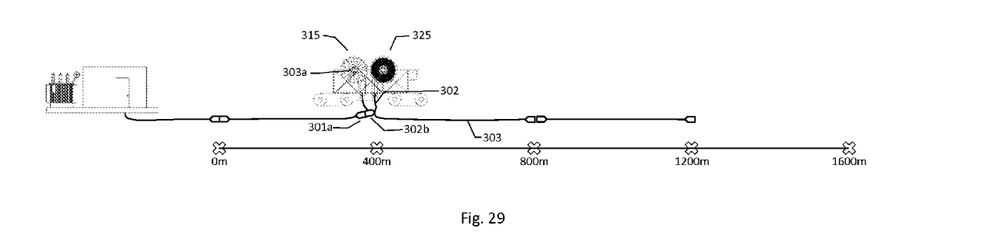

In FIG. 29: (a) plug 301a has been disconnected from reel 315 and is connected with the plug 302b, whose opposite member plug 302a is connected in reel 325; and (b) cable 303's plug 303a is been connected with reel 315. Reel 325 is now powdered up, while reel 315 is not.

Figure 30:
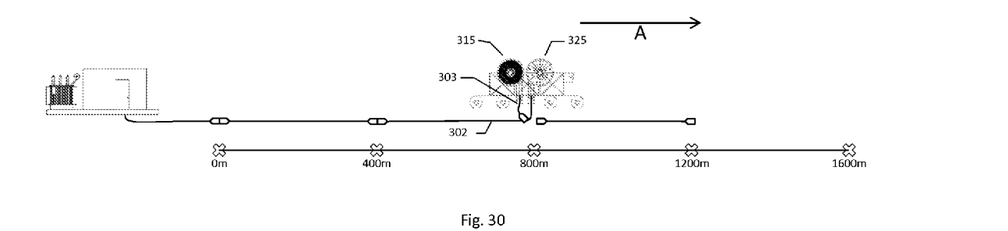

FIG. 30 depicts the conveyor having moved further to the right in the direction of Arrow A. Reel 325 has substantially unspooled cable 302, and reel 315 has drawn up cable 303.

Figure 31:
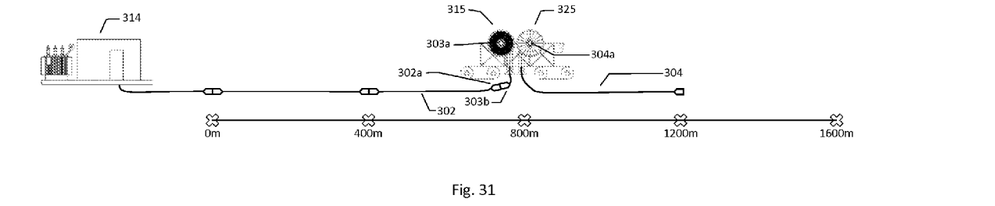

In FIG. 31 plug 302a has been disconnected from reel 325, which is empty, and plug 302a is now connected with plug 303b. As a result full reel 315, in which plug 303a remains connected, is now powdered up by having a direct electrical connection with electric house 314. Plug 304a is now connected with empty reel 325, and reel 325 is not powered up.

Figure 32:
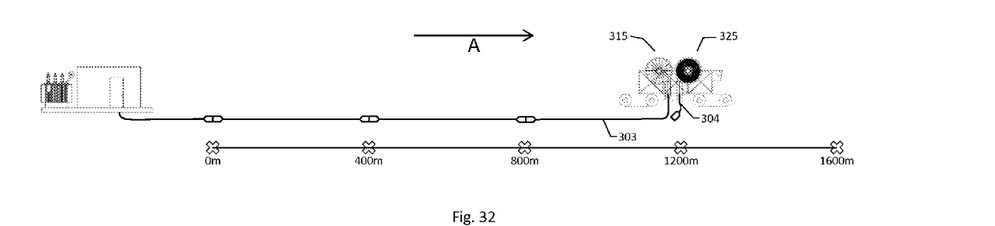

In FIG. 32 the conveyor has moved further to the right. Reel 315 has unspooled cable 303 and reel 325 has drawn up cable 304.

Figure 33:
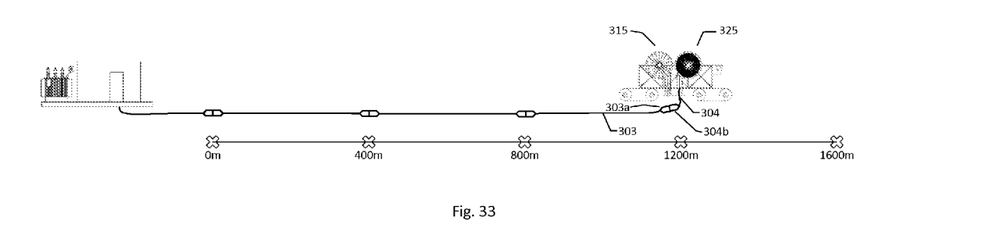
Figure 34:
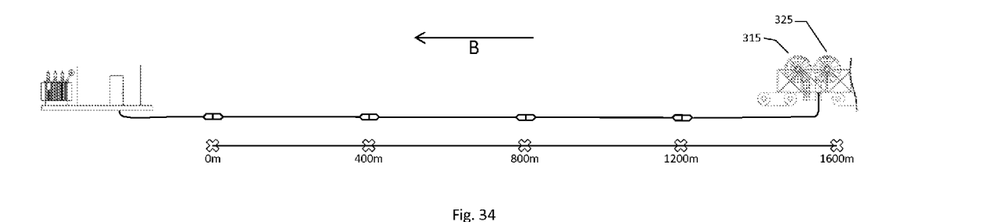

In FIG. 33, plug 303a has been disconnected from reel 315 and connected with plug 304b, thus powering up full reel 325. Empty reel 315 is no longer powered up.

In FIG. 34 the conveyor has again moved 400 m in the direction of arrow A. Reel 325 has unspooled cable 304. Reel 315 remains empty. The conveyor 308 is now positioned to start on return leg in the direction of arrow B, with reel 325 remaining powered as it begins to take up cable.

As shown, for the majority of the conveyor's run when one reel is spooling up cable the other reel is unspooling. During the run of the conveyor in the direction of arrow A, the reel unspooling the cable is live in that it maintains a direct connection with the electric house, while the reel spooling up cable is not powered up. In the return run in the direction of arrow B, the opposite is the case, in that the reel spooling up the cable is "live", while the reel unspooling cable is not powered up.

Figure 35:
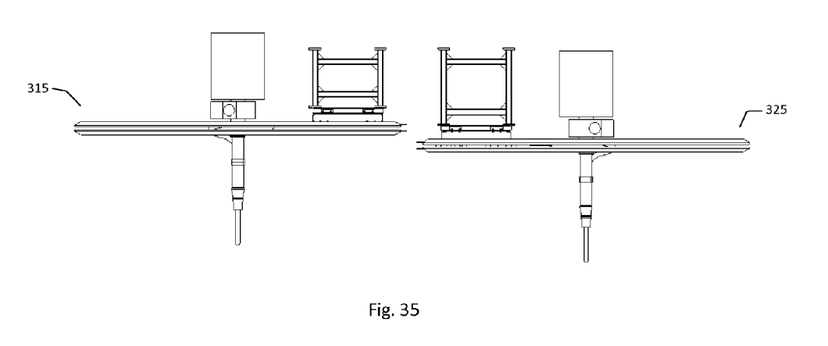
FIG. 35 depicts a plan view of the two reel embodiment.

FIG. 35 is a plan view of the two reel embodiment of the present invention. Preferably, there is a small horizontal offset ←X→ between the two cable reels 315 and 325. This offset is to avoid interference between the cables and as they are picked up and laid down by the reels, and make it easier to swap cable ends at the transition points.

Figure 36:
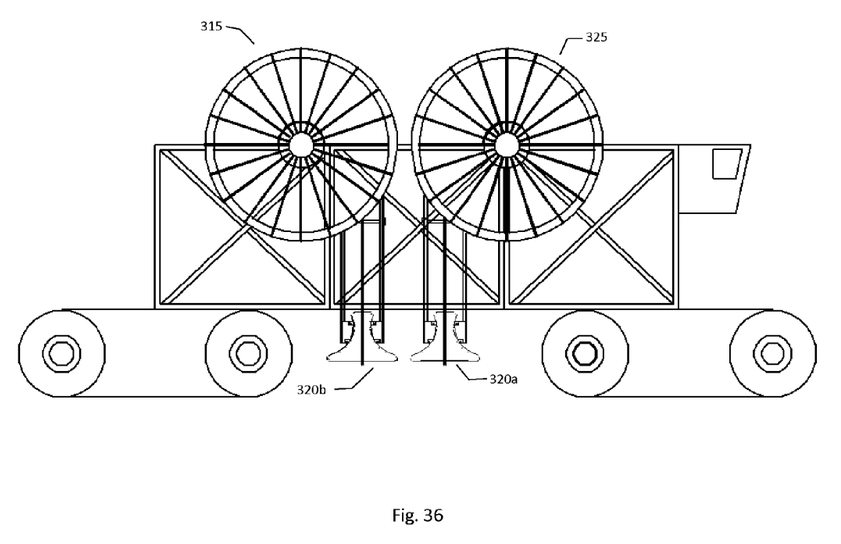
FIG. 36 depicts an elevation view of the two reel embodiment.

FIG. 36 is an elevation view of the two reel embodiment showing the reels 315 and 325, diverters 320a and 320b, as mounted on the conveyor 308 framework.

It is to be understood that the form of this invention as shown is merely a preferred embodiment. Various changes may be made in the function and arrangement of parts;

equivalent means may be substituted for those illustrated and described; and certain features may be used independently from others without departing from the spirit and scope of the invention as defined in the following claims.

What is claimed is:

1. A method of providing operating electrical power from a power source to a mobile conveyor utilized in material handling at a mine site as the conveyor moves over a predetermined path at the site comprising
   (a) laying out at least one length of a power cable having an electrical connector on each of its ends in series adjacent and parallel to the conveyor's predetermined path, said at least one length of a power cable being folded back on itself when laid out, with its two ends adjacent to each other and closer to the power source than the cable fold;
   (b) electrically connecting an end of a first laid out power cable to the stationary power source and electrically connecting the other end of the first laid out power cable to an empty power cable reel on the mobile conveyor that is wired to a junction box to thereby power to the mobile conveyor;
   (c) moving the mobile conveyor away from the stationary power source while (i) spooling up the laid out power cable until the conveyor reaches the cable fold and (ii) unspooling the laid out power cable after the conveyor moves past the fold until the reel is substantially empty.

2. The method of claim 1 further comprising
   (d) disconnecting the cable end from the reel and connecting the disconnected cable end with one end of the subsequent laid out power cable in series;
   (e) electrically connecting the other end of the subsequent laid out power cable to the reel;
   (f) repeating step (c), and
   (g) repeating step (d), (e) and (f) with each subsequent laid out cable.

3. A method of providing operating electrical power from a stationary power source to a mobile conveyor utilized in material handling at a mine site as the conveyor moves over a predetermined path at the site comprising
   (a) providing a mobile conveyor having a first power cable reel and a second power cable reel, with both reels having, respectively, a first section and a second section of power cable spooled thereon, with the first section and second section each having two ends that each have an electrical connector, with one end of each power cable being electrically connected to the reel on which it is located, with each reel being wired into a junction box for the mobile conveyor, and with the other end of the power cable on the first power cable reel being electrically connected with the stationary power source to thereby provide electrical power to the mobile conveyor and the other end of the power cable on the second reel being unconnected;
   (b) laying out at least one section of a power cable adjacent to and approximately parallel to the predetermined path of the mobile conveyor and end to end when a plurality of sections are laid out, with each laid out section having a first and second end with an electrical connector on each end;
   (c) moving the mobile conveyor, while unspooling the cable electrically connected to the stationary power source, over the predetermined path away from the stationary power source until the mobile conveyor is adjacent to the first end of a first laid out power cable and the electrically connected cable is essentially unspooled;
   (d) disconnecting the electrically connected cable from the reel, connecting said disconnected cable to the second section of cable, thus maintaining power to the mobile conveyor, and
   (e) connecting the first end of the first laid out power cable to the reel having no cable connected thereto; and
   (e) moving the mobile conveyor, while unspooling the second section of cable and spooling up the first laid out cable, over the predetermined path away from the stationary power source.

4. A power cable reel for use in a mobile conveyor utilized in material handling at a mine site, said power cable reel comprising a plug into which a mating electrical connector on a power cable can be quickly connected and disconnected, wherein said plug is also adaptable to be electrically connected to a junction box on the mobile conveyor while being connected to a power cable; and a removable reel section which permits said power cable access to an internal portion of said power cable reel.

5. The power cable reel of claim 4 further comprising a drive unit.

* * * * *